United States Patent
Kim et al.

(10) Patent No.: US 10,546,574 B2
(45) Date of Patent: Jan. 28, 2020

(54) VOICE RECOGNITION APPARATUS AND METHOD

(71) Applicant: SAMSUNG ELECTRONICS CO., LTD., Suwon-si (KR)

(72) Inventors: Jung-Hoe Kim, Seongnam-si (KR); Jehun Jeon, Suwon-si (KR); Kyoung Gu Woo, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/686,913

(22) Filed: Aug. 25, 2017

(65) Prior Publication Data

US 2018/0061394 A1   Mar. 1, 2018

(30) Foreign Application Priority Data

Sep. 1, 2016 (KR) .................. 10-2016-0112549

(51) Int. Cl.
    *G10L 15/02*   (2006.01)
    *G10L 15/22*   (2006.01)
    *G10L 15/14*   (2006.01)
    *G10L 15/18*   (2013.01)

(52) U.S. Cl.
    CPC ............. *G10L 15/02* (2013.01); *G10L 15/14* (2013.01); *G10L 15/1815* (2013.01); *G10L 15/22* (2013.01)

(58) Field of Classification Search
    CPC ..... G10L 15/02; G10L 15/14; G10L 15/1815; G10L 15/22; G10L 15/04; G10L 15/197; G10L 25/03
    See application file for complete search history.

(56) References Cited

U.S. PATENT DOCUMENTS

| | | | |
|---|---|---|---|
| 9,292,254 B2 | 3/2016 | Simpson et al. | |
| 2007/0055529 A1* | 3/2007 | Kanevsky | G10L 15/1822 704/275 |
| 2013/0325446 A1* | 12/2013 | Levien | G10L 15/30 704/201 |
| 2015/0081279 A1 | 3/2015 | Suleman et al. | |
| 2016/0027440 A1* | 1/2016 | Gelfenbeyn | G10L 15/32 704/244 |
| 2016/0148612 A1* | 5/2016 | Guo | G06F 17/27 704/257 |

FOREIGN PATENT DOCUMENTS

| | | |
|---|---|---|
| JP | 2010-217502 A | 9/2010 |
| JP | 2014-21475 A | 2/2014 |
| KR | 10-2010-0048842 A | 5/2010 |
| KR | 10-2011-0038474 A | 4/2011 |
| KR | 10-2012-0012919 A | 2/2012 |
| KR | 10-2012-0061133 A | 6/2012 |

* cited by examiner

*Primary Examiner* — Angela A Armstrong
(74) *Attorney, Agent, or Firm* — Cha & Reiter, LLC

(57) ABSTRACT

A voice recognition apparatus and corresponding method include a processor configured to calculate a probability distribution corresponding to an intent associated with an utterance of a user by applying pre-stored training data to an input voice signal input based on the utterance. The processor is also configured to select a target feature extractor including either one or both of a training-based feature extractor and a rule-based feature extractor using the calculated probability distribution, and extract a feature associated with the utterance based on the selected target feature extractor.

17 Claims, 8 Drawing Sheets

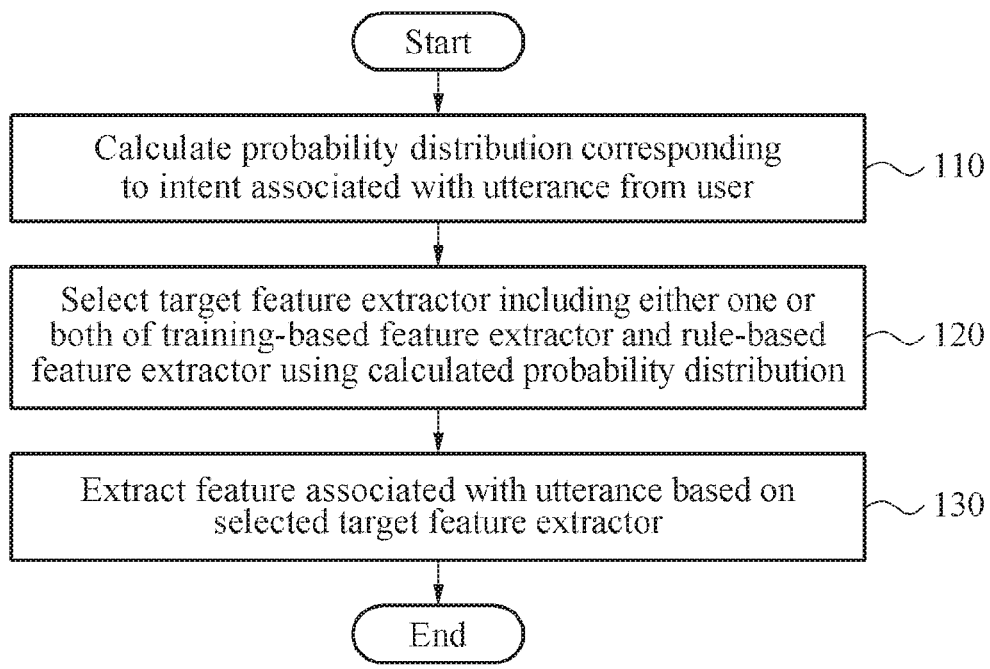

VOICE RECOGNITION APPARATUS AND METHOD

CROSS-REFERENCE TO RELATED APPLICATION(S)

This application claims the benefit under 35 USC § 119(a) of Korean Patent Application No. 10-2016-0112549 filed on Sep. 1, 2016, in the Korean Intellectual Property Office, the entire disclosure of which is incorporated herein by reference for all purposes.

BACKGROUND

1. Field

The following description relates to voice recognition apparatus and method based on feature extraction.

2. Description of Related Art

A voice recognition apparatus configured to control an electronic device using a voice signal based on a user environment has been widely used. For example, many users check weather using smartphones and set destinations using navigation systems. Thus, communication with a user has been enabled using a voice signal of the user as an input signal, which replaces a conventional typing-type input.

For example, the electronic device receives a voice signal from a user, analyzes an intent or meaning from the received voice signal, and executes a task corresponding to the analyzed intent.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In accordance with an embodiment, there may be provided a voice recognition apparatus, including: a processor configured to: calculate a probability distribution corresponding to an intent associated with an utterance of a user by applying pre-stored training data to an input voice signal input based on the utterance; select a target feature extractor including either one or both of a training-based feature extractor and a rule-based feature extractor using the calculated probability distribution; and extract a feature associated with the utterance based on the selected target feature extractor.

The voice recognition apparatus may further include a memory configured to store instructions, wherein the processor may be further configured to execute the instructions to calculate the probability distribution, select the target feature extractor, and extract the feature associated with the utterance.

The processor may further include: a calculator configured to calculate the probability distribution corresponding to the intent associated with the utterance of the user by applying the pre-stored training data to the input voice signal input based on the utterance; a selector configured to select the target feature extractor including either one or both of the training-based feature extractor and the rule-based feature extractor using the calculated probability distribution; and an extractor configured to extract the feature associated with the utterance based on the selected target feature extractor.

The selector may be configured to verify an intent having a probability value in a range and select, as the target feature extractor, one of the training-based feature extractor and the rule-based feature extractor based on the verified intent.

The voice recognition apparatus may further include: an output generator configured to perform a task corresponding to the extracted feature, and wherein the selector may be configured to verify an intent having a probability value in a range and select, as the target feature extractor, a number of feature extractors based on the verified intent, wherein the output generator may be configured to calculate a likelihood value corresponding to each of the number of feature extractors.

The selector may be configured to select, as the number of feature extractors, either one or both of the training-based feature extractor or the rule-based feature extractor.

The output generator may be configured to perform a target task corresponding to a feature outputting a highest likelihood value among likelihood values corresponding, respectively, to the number of feature extractors.

The voice recognition apparatus may further include: an acquirer configured to obtain either one or both of user information and device information; and a post-processor configured to adjust a probability value of the intent using the either one or both of the user information and the device information.

The acquirer may be configured to obtain either one or both of the user information and the device information corresponding to a point in time at which the utterance may be input, wherein the acquirer repeats the obtaining of either one or both of the user information and the device information based on a number of times utterances are input.

In response to the acquirer obtaining the device information operating in a first mode, the post-processor may be configured to adjust a probability value of an intent uncorrelated with the first mode to be less than or equal to a threshold value.

In response to the acquirer obtaining, as the user information, a statistical intent distribution of the user corresponding to a point in time at which the utterance may be input, the post-processor may be configured to adjust the probability distribution using the statistical intent distribution.

In response to the acquirer obtaining the device information predetermined based on a device characteristic, the post-processor may be configured to adjust a probability value of an intent uncorrelated with the device information to be less than or equal to a threshold value.

In accordance with a further embodiment, there may be provided a voice recognition method, including: calculating a probability distribution corresponding to at least one intent associated with an utterance of a user by applying pre-stored training data to an input voice signal input based on the utterance; selecting a target feature extractor including either one or both of a training-based feature extractor and a rule-based feature extractor using the calculated probability distribution; and extracting a feature associated with the utterance based on the selected target feature extractor.

The selecting of the target feature extractor may further include: verifying an intent having a probability value in a range.

The voice recognition method may further include: selecting, as the target feature extractor, a number of feature extractors based on the verified intent; and calculating a likelihood value corresponding to each of the number of feature extractors.

The voice recognition method may further include: performing a task corresponding to a feature outputting a highest likelihood value among likelihood values corresponding, respectively, to the number of feature extractors.

The selecting of the target feature extractor may further include: selecting one of the training-based feature extractor and the rule-based feature extractor using the calculated probability distribution based on a probability value in a range.

In accordance with a further embodiment, there may be provided a non-transitory computer-readable storage medium storing instructions that, when executed by a processor, cause the processor to perform the method described above.

In accordance with another embodiment, there may be provided an electronic device configured to provide a conversation agent to converse with a user, the electronic device including: a sensor configured to obtain an input voice signal input based on an utterance of the user; a processor configured to calculate a probability distribution corresponding to an intent associated with the utterance by applying training data to the input voice signal, select a target feature extractor based on the calculated probability distribution, extract a feature associated with the utterance based on the selected target feature extractor, and output a result indicative thereof; and a display configured to output, to the user, the result, wherein the target feature extractor includes either one or both of a training-based feature extractor and a rule-based feature extractor.

The processor may be configured to verify an intent having a probability value in a preset range and select, as the target feature extractor, one of the training-based feature extractor and the rule-based feature extractor based on the verified intent.

The processor may be configured to select, as the target feature extractor, a number of feature extractors based on a probability value in a preset range, and perform a task corresponding to a feature outputting a highest likelihood value among likelihood values corresponding, respectively, to the preset number of feature extractors.

Other features and aspects will be apparent from the following detailed description, the drawings, and the claims.

BRIEF DESCRIPTION OF THE DRAWINGS

FIG. 1 is a flowchart illustrating an example of a series of operations executed by a voice recognition apparatus.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 2A:
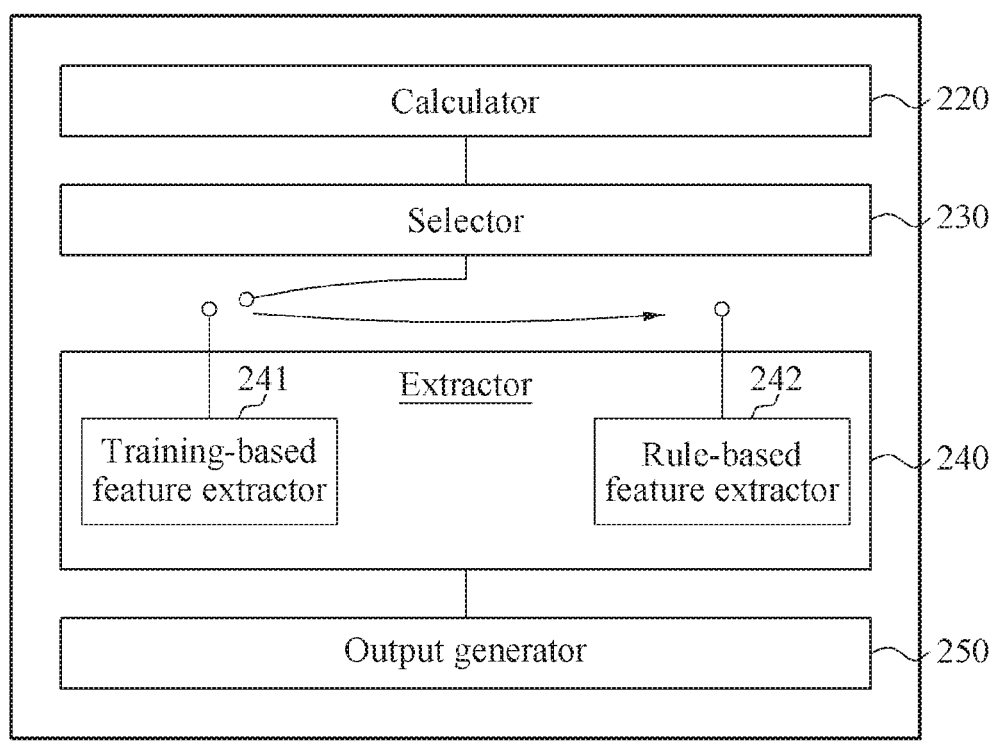
FIG. 2A is a diagram illustrating an example of a voice recognition apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood that will be apparent after an understanding of the disclosure of this application. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

A term "feature" used herein refers to a task associated with an intent of or a meaning of or a course of action to be executed or done based on an utterance of a user.

A training-based feature extractor to be described hereinafter refers to a feature extractor generated based on machine learning using, as training data, a relationship between a voice signal input from a user and an extracted feature.

A rule-based feature extractor to be described hereinafter refers to a feature extractor configured to extract a feature from the voice signal based on a setting by the user. For example, a voice recognition apparatus includes the rule-based feature extractor configured to extract, as a feature, a second voice signal grammatically predicted from a portion of a first voice signal by applying a grammar-based natural language understanding method.

Hereinafter, examples are described in detail with reference to the accompanying drawings. Like reference numerals in the drawings denote like elements, and a known function or configuration will be omitted herein.

FIG. 1 is a flowchart illustrating an example of a series of operations executed by a voice recognition apparatus.

Referring to FIG. 1, in operation 110, the voice recognition apparatus calculates a probability distribution corresponding to one or more intents associated with an utterance from a user. The voice recognition apparatus obtains an input voice signal corresponding to the utterance from the user. In addition, the voice recognition apparatus calculates the probability distribution corresponding to the intent associated with the utterance by applying pre-stored training data to the obtained input voice signal. For example, the training data indicates a training-based intent classifier generated as a result of machine learning based on a relationship between each of a plurality of voice signals and an intent of a speaker and a domain. In one example, a domain refers to a set of instructions to be defined based on a function of a device or an intent of a user.

In operation 120, the voice recognition apparatus selects a target feature extractor including either one or both of a training-based feature extractor and a rule-based feature extractor using the calculated probability distribution. In an example in which an intent having a highest probability value in the probability distribution calculated in operation 110 is calculated to be a first intent, the voice recognition apparatus selects, as the target feature extractor, the training-based feature extractor associated with the first intent based on a preset condition. Although the example illustrated in FIG. 1 is described based on the selecting of the training-based feature extractor associated with the first intent, examples are not limited to the illustrated example and various changes may be made to the example without departing from the spirit of the application.

In operation 130, the voice recognition apparatus extracts a feature associated with the utterance based on the selected target feature extractor. In an example in which the training-based feature extractor associated with the first intent is selected as the target feature extractor, the voice recognition apparatus calculates a likelihood value of each of features corresponding to the input voice signal using the training-based feature extractor. The voice recognition apparatus executes a first task corresponding to the input voice signal based on a first feature corresponding to a highest likelihood value.

As described above, the voice recognition apparatus may be a structural device or processor that processes a voice signal from a user. The voice recognition apparatus may be of various structural types, for example, a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad), or a body implantable device. In some embodiments, examples of the wireless power transmitter or electronic device may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a media box, a gaming console, an electronic dictionary, an electronic key, a camcorder, or an electronic picture frame.

The voice recognition apparatus may include, for example, a smartphone, a smart television (TV), a smart watch, a smart washing machine, a smart camera, a smart audio system, a smart bicycle, a smart glasses, a remote controller, a smart refrigerator, a smart air-conditioner, a laptop, a personal digital assistant (PDA), and a tablet. Further, when a communication function is added to such a voice recognition apparatus and voice recognition apparatuses are connected through a communication network, the voice recognition apparatuses share information with one another.

Hereinafter, an example of a method executed by the voice recognition apparatus to calculate a likelihood value corresponding to each of extracted features and perform at least one task based on the calculated likelihood value will be described in detail with reference to the accompanying drawings.

FIG. 2A is a diagram illustrating an example of a voice recognition apparatus.

In the example illustrated in FIG. 2A, a voice recognition apparatus 211 recognizes an input voice signal corresponding to an utterance from a user, and outputs a result indicative of a performance or an execution of a task corresponding the input voice signal being recognized. In one embodiment, a result of recognizing a voice signal is simply referred to as a voice recognition result. The voice recognition apparatus 211 outputs the voice recognition result using at least one of a training-based feature extractor or a rule-based feature extractor based on an intent of the user. For example, the voice recognition apparatus 211 determines that a feature needs to be extracted based on the rule-based feature extractor corresponding to a small-scale intent of the utterance from the user, and extracts a plurality of features associated with the utterance. In another example, the voice recognition apparatus 211 determines that a feature needs to be extracted based on the training-based feature extractor configured to cover a domain of a complex intent of the utterance from the user, and extracts a plurality of features associated with such utterance.

Referring to FIG. 2A, the voice recognition apparatus 211 includes a calculator 220, a selector 230, an extractor 240, and an output generator 250.

The calculator 220 calculates a probability distribution corresponding to at least one intent associated with an utterance from a user by applying pre-stored training data to an input voice signal. In a case that the utterance from the user is received and a domain supported by the voice recognition apparatus 211 includes an alarm function, a weather check function, a music play function, a schedule check function, and a text message transmission function, the calculator 220 calculates a first probability distribution, for example, [0.3 0.25 0.2 0.15 0.1], with probability values corresponding, respectively, to intents associated with the utterance. For example, the calculator 220 calculates to be 0.3 a first probability value corresponding to a first intent associated with the alarm function supported by the voice recognition apparatus 211. The calculator 220 calculates to be 0.1 a second probability value corresponding to a second intent associated with the text message transmission function supported by the voice recognition apparatus 211. In this manner, the calculator 220 calculates the first probability distribution with the probability values corresponding to the intents associated with respective domains that are supported by the voice recognition apparatus 211.

The selector 230 selects a target feature extractor including either one or both of a training-based feature extractor 241 and a rule-based feature extractor 242 using the calculated probability distribution. The selector 230 verifies a probability value corresponding to each of the intents that is included in the probability distribution calculated by the calculator 220.

The selector 230 verifies an intent having a probability value in a preset range and selects, as the target feature extractor, the training-based feature extractor 241 or the rule-based feature extractor 242 based on the verified intent. For example, in response to the calculator 220 calculating the first probability distribution, for example, [0.3 0.25 0.2 0.15 0.1], corresponding to the respective intents associated with the alarm function, the weather check function, the music play function, the schedule check function, and the text message transmission function, the selector 230 verifies an intent associated with the alarm function having a highest probability value of 0.3. In such a case, when a feature associated with the alarm function supported by the voice recognition apparatus 211 includes complex features, for example, setting an alarm time, setting an alarming cycle, and setting an alarm music, the selector 230 selects, as the target feature extractor, the training-based feature extractor 241 based on the intent associated with the alarm function.

In another example, in a case that the calculator 220 calculates a second probability distribution, for example, [0.05 0.25 0.2 0.15 0.35], corresponding to corresponding intents associated with the alarm function, the weather check function, the music play function, the schedule check function, and the text message transmission function, the selector 230 verifies an intent associated with the text message transmission function having a highest probability value of 0.35. In such example, when a domain associated with the text message transmission function supported by the voice recognition apparatus 211 is determined to be of a simple scale based on the preset condition, the selector 230 selects, as the target feature extractor, the rule-based feature extractor 242 based on the intent associated with the text message transmission function.

The extractor 240 extracts a feature associated with the utterance based on the selected target feature extractor. The extractor 240 extracts the feature associated with the utterance using one of the training-based feature extractor 241 and the rule-based feature extractor 242, which is selected by the selector 230. The output generator 250 performs a task corresponding to the intent classified with respect to the input voice signal associated with the utterance of the user and the extracted feature and outputs a result indicative thereof.

Figure 2B:
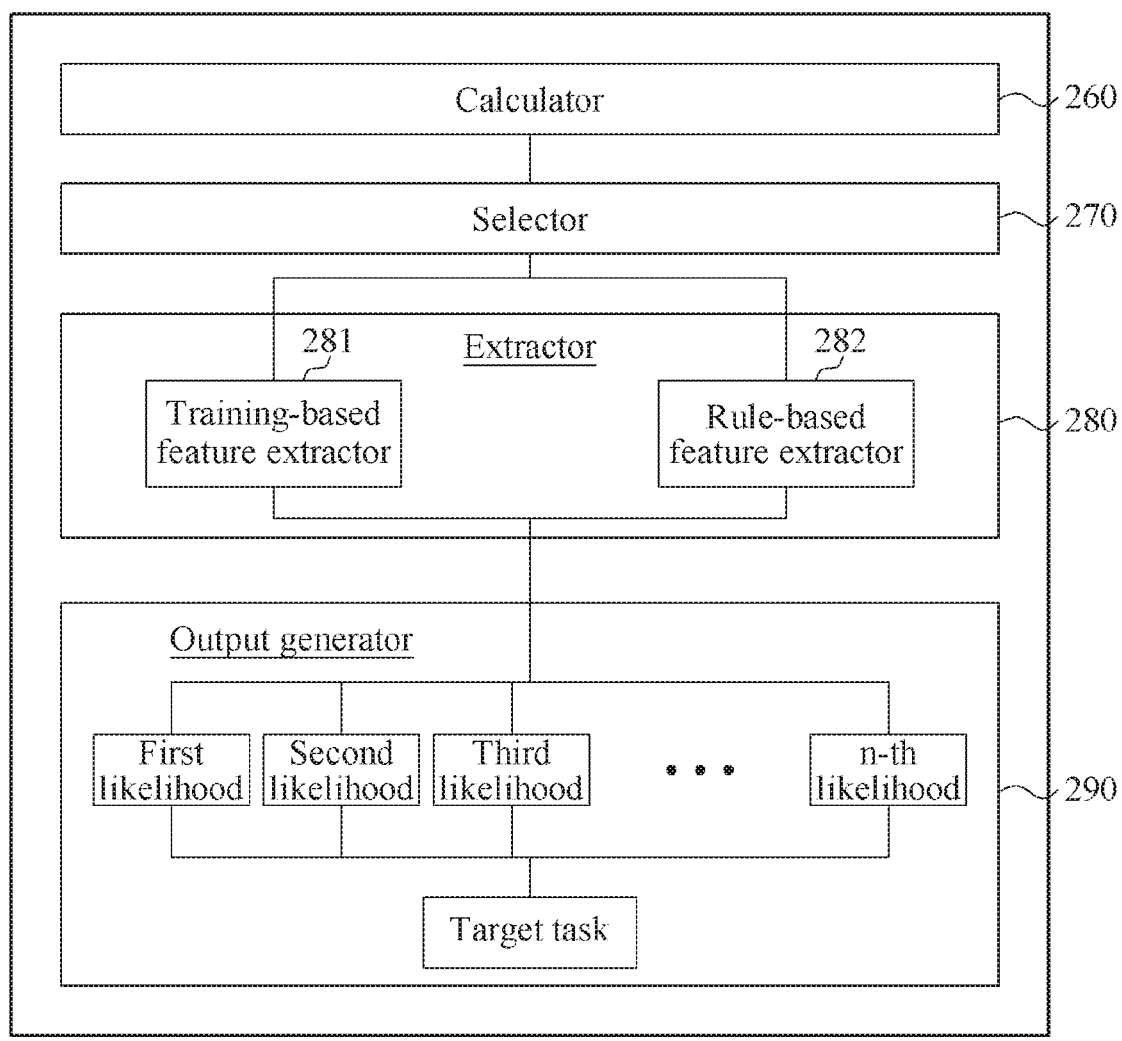
FIG. 2B is a diagram illustrating another example of a voice recognition apparatus.

FIG. 2B is a diagram illustrating another example of a voice recognition apparatus.

Referring to FIG. 2B, a voice recognition apparatus 212 includes a calculator 260, a selector 270, an extractor 280, and an output generator 290.

The calculator 260 calculates a probability distribution corresponding to at least one intent associated with an utterance of a user by applying pre-stored training data to an input voice signal. For a detailed description of the calculator 260, reference may be made to the description of the calculator 220 provided with reference to FIG. 2A and, thus, a more detailed and repeated description is omitted here for brevity.

Different from the selector 230 described with reference to FIG. 2A, the selector 270 selects, as a target feature extractor, a preset number of feature extractors using the probability distribution calculated by the calculator 260. The selector 270 verifies an intent having a probability value within a preset range in the calculated probability distribution.

For example, in a case that the calculator 260 calculates a third probability distribution, for example, [0.3 0.25 0.2 0.15 0.1], corresponding to respective intents associated with an alarm function, a weather check function, a music play function, a schedule check function, and a text message transmission function of a domain supported by the voice recognition apparatus 212, the selector 270 verifies an intent having a probability value in a preset range in the third probability distribution.

In one example, a provability value in the range indicates a probability value greater than or equal to a probability value corresponding to a fixed or a pre-defined threshold value. In an example in which a probability value, as the threshold value, is determined to be 0.2, the selector 270 verifies a first intent associated with the alarm function, a second intent associated with the weather check function, and a third intent associated with the music play function, which correspond to the probability value of 0.2 or greater. The selector 270 selects, as the target feature extractor, three feature extractors based on the three intents having the probability value in the range. The probability value of 0.2 is described only as an example and, thus, not construed as limiting a scope of other examples, and various changes may be made to the example that will be apparent after an understanding of the disclosure of this application.

In another example, the probability value in the range indicates the calculator 260 sequentially selecting a probability value in the probability distribution calculated. For example, the selector 270 verifies the first intent associated with the alarm function and the second intent associated with the weather check function, which correspond to highest two probability values in the third probability distribution calculated by the calculator 260. The selector 270 selects, as the target feature extractor, two feature extractors based on the two intents having the probability value in the range. The highest two probability values in the probability distribution are not construed as limiting a scope of other examples, and various changes may be made to the example, for example, using highest twenty (20) probability values.

The extractor 280 extracts a feature associated with the utterance based on the selected target feature extractor. Dissimilar to the extractor 240 described with reference to FIG. 2A, the extractor 280 extracts features associated with or corresponding to the utterance using both a training-based feature extractor 281 and a rule-based feature extractor 282. For example, in a case that the selector 270 verifies the first intent associated with the alarm function and the second intent associated with the weather check function, which correspond to the highest two probability values in the third probability distribution, the selector 270 selects a training-based first feature extractor associated with the alarm function and a rule-based second feature extractor associated with the weather check function. In such a case, the extractor 280 extracts, from the input voice signal, a first feature using the training-based first feature extractor and a second feature using the rule-based second feature extractor.

The output generator 290 calculates a likelihood value corresponding to each of the plurality of features using a feature extracted by each of the feature extractors, which are selected by the selector 270. In addition, the output generator 290 performs a target task corresponding to a feature outputting a highest likelihood value among likelihood values corresponding, respectively, to the features.

As described above, the voice recognition apparatus 212 recognizes an input voice signal associated with an utterance from a user using either one or both of a training-based feature extractor and a rule-based feature extractor. In one example, using the rule-based feature extractor is effective in feature extraction in a small-scale domain and the training-based feature extraction effectively covers a complex domain based on deep learning technology to reduce latency and increase an efficiency in a field of voice recognition.

Figure 3:
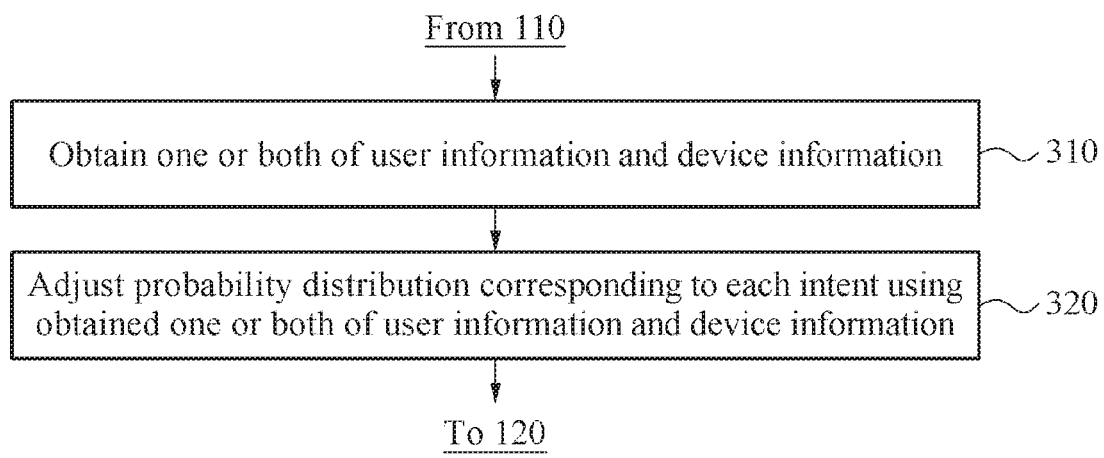
FIG. 3 is a flowchart illustrating an example of a method executed by a voice recognition apparatus to adjust a probability value associated with each intent.

FIG. 3 is a flowchart illustrating an example of a method executed by a voice recognition apparatus to adjust a probability value associated with each intent.

Referring to FIG. 3, in operation 310, a voice recognition apparatus obtains one or both of user information and device information. The user information refers to information associated with the user in context information, which is used to analyze an intent of an utterance of the user. For example, the user information includes at least one of user profile information including, for example, an age of the user, a gender of the user, and history information of the user, or surrounding environment information including, for example, a time and a location at which the utterance is made and weather. In an example, the history information of the user indicates a statistical intent distribution associated with the user.

The device information refers to information associated with a device in the context information used to analyze the intent of the utterance of the user. The device is the voice recognition apparatus, or a target device for which a task is to be executed by the voice recognition apparatus. For example, the device information includes one or both of operation information about an operation at a point in time at which the utterance is received as an input voice signal and characteristic information about characteristics of the device.

In one example, the voice recognition apparatus periodically obtains one or both of the user information and the device information based on a preset period. In another example, in response to the input voice signal of the utterance being detected, the voice recognition apparatus obtains one or both of the user information and the device information corresponding to a point in time at which the utterance is input. The voice recognition apparatus repetitively obtains one or both of the user information and the device information based on or depending upon a number of utterances.

In operation 320, the voice recognition apparatus adjusts a probability distribution corresponding to each intent associated with the utterance using one or both of the user information and the device information obtained in operation 310. In one example, the voice recognition apparatus adjusts, to be higher, a probability value of an intent associated with a highly frequently used function in the probability distribution, based on the history information about the user. Also, the voice recognition apparatus adjusts, to be lower, a probability value of an intent associated with a function uncorrelated with an operation mode of the device in the probability distribution. The method executed by the voice recognition apparatus to adjust a probability value of each intent using the user information or the device information will be described in greater detail with reference to the accompanying drawings.

Figure 4:
FIGS. 4 and 5 are diagrams illustrating examples of a method executed by a voice recognition apparatus to adjust a probability value associated with each intent using user information and device information.
Figure 5:
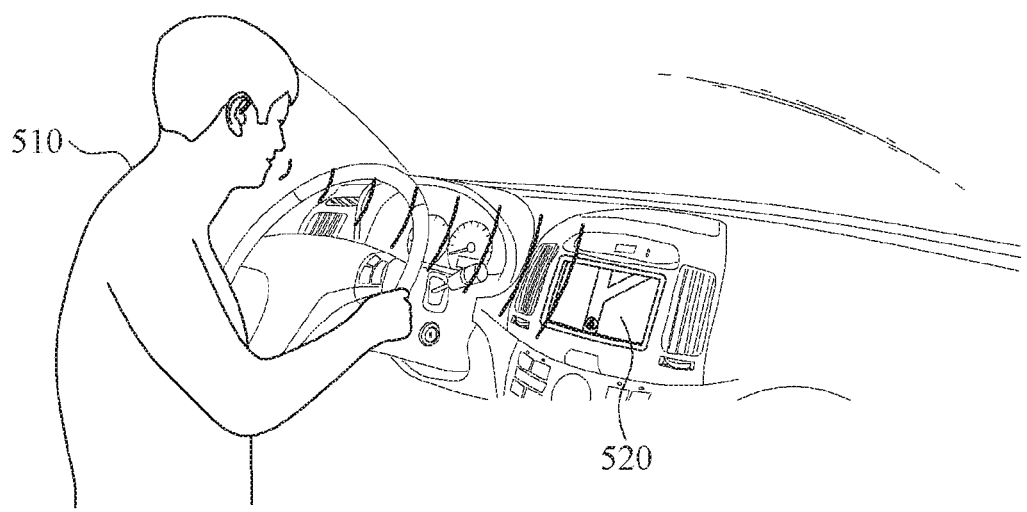

FIGS. 4 and 5 are diagrams illustrating examples of a method executed by a voice recognition apparatus to adjust a probability value of each intent using user information and device information.

FIG. 4 is a diagram illustrating an example of a method executed by a watch-type voice recognition apparatus to adjust a probability value of each intent using user information and device information. Referring to FIG. 4, a user 410 makes an utterance to a watch-type voice recognition apparatus 420 to perform a task corresponding to the utterance.

In the example illustrated in FIG. 4, the voice recognition apparatus 420 obtains an input voice signal associated with the utterance of the user 410 at 1 AM in the morning. As described with reference to FIG. 2A, a calculator of the voice recognition apparatus 420 calculates a first probability distribution, for example, [0.3 0.25 0.2 0.15 0.1], corresponding to respective intents associated with an alarm function, a weather check function, a music play function, a schedule check function, and a text message transmission function.

In one example, the voice recognition apparatus 420 obtains, as user information, a statistical intent distribution of the user 410 corresponding to 1 AM, at which the utterance is input by the user 410. For example, in response to the statistical intent distribution being obtained in a following sequential order of the alarm function, the weather check function, the music play function, the schedule check function, and the text message transmission function based on a frequency of use of each function, for example, 50 times of use, 30 times of use, ten times of use, five times of use, and five times of use, respectively, the voice recognition apparatus 420 adjusts respective probability values in the first probability distribution using, as the user information, the frequency of use by the user of each function corresponding to or at 1 AM. The voice recognition apparatus 420 calculates an adjusted first probability distribution, for example, [0.583, 0.291, 0.078, 0.029, 0.019], from [0.3×0.5, 0.25×0.3, 0.2×0.1, 0.15×0.05, 0.1×0.05]/(0.3×0.5+0.25× 0.3+0.2×0.1+0.15×0.05+0.1×0.05), using the user information.

In another example, the voice recognition apparatus 420 obtains device information including a restriction on a display environment as a watch-type device. For example, the voice recognition apparatus 420 obtains the device information including identification information of the watch-type device, or a combination of a text and a series of numbers, for example, a serial number. The voice recognition apparatus 420 verifies whether the watch-type device supports the text message transmission function based on the restriction on the display environment. The voice recognition apparatus 420 adjusts the respective probability values in the first probability distribution using the device information. The voice recognition apparatus 420 calculates an adjusted first probability distribution, for example, [0.33, 0.28, 0.22, 0.17, 0], from [0.3+0.1×0.3/0.9, 0.25+0.1×0.25/0.9, 0.2+0.1×0.2/0.9, 0.15+0.1×0.15/0.9, 0.1×0], using the device information.

As described above, the voice recognition apparatus 420 adjusts a probability distribution corresponding to each intent using, as user information and device information, an environment in which the user 410 makes an utterance. Thus, a probability value of an intent of the utterance of the user 410 is accurately calculated, and a training-based feature extractor or a rule-based feature extractor corresponding to each intent is properly applied. Thus, an efficiency of a voice recognition method is improved.

FIG. 5 is a diagram illustrating another example of a method executed by a voice recognition apparatus that is operated in a driving mode. The method is configured to adjust a probability value of each intent using user information and device information. Referring to FIG. 5, a user 510 driving a vehicle makes an utterance for a voice recognition apparatus 520, which is set to be in a driving mode to perform a task corresponding to the utterance.

In the example illustrated in FIG. 5, a calculator of the voice recognition apparatus 520 calculates a fourth probability distribution, for example, [0.3 0.25 0.2 0.15 0.1], corresponding to respective intents associated with a navigation function, a weather check function, a music play function, a schedule check function, and a photo gallery function. When the user 510 makes an utterance, the voice recognition apparatus 520 repetitively obtains device information, which corresponds to a point in time at which the utterance is input by the user 510, based on a number of utterances. The voice recognition apparatus 520 obtains, as the device information, operation information corresponding to the driving mode. In addition, the voice recognition apparatus 520 adjusts a probability value of an intent uncorrelated with the driving mode to be less than or equal to a threshold value. For example, the voice recognition apparatus 520 adjusts to be 0 a probability value of an intent associated with the photo gallery function uncorrelated with the driving mode. The voice recognition apparatus 520 calculates an adjusted fourth probability distribution, for example, [0.33, 0.28, 0.22, 0.17, 0], from [0.3+0.1×0.3/0.9, 0.25+0.1×0.25/0.9, 0.2+0.1×0.2/0.9, 0.15+0.1×0.15/0.9, 0.1×0], using the device information including the operation mode.

Figure 6A:
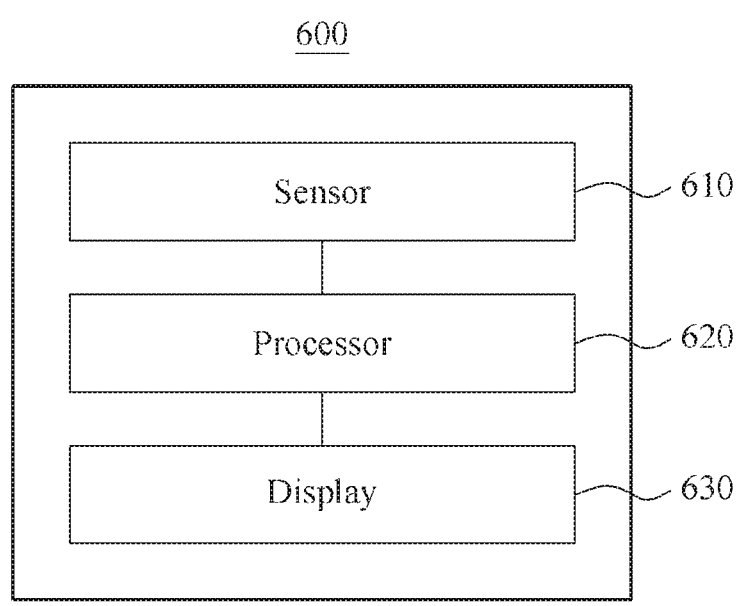
FIG. 6A is a diagram illustrating an example of an electronic device providing a conversation agent to converse with a user.

FIG. 6A is a diagram illustrating an example of an electronic device providing a conversation agent to converse with a user.

Referring to FIG. 6A, an electronic device 600 includes a sensor 610, a processor 620, and a display 630. The sensor 610 obtains an input voice signal input based on an utterance of a user. For example, the sensor 610 may be embodied as a microphone, and obtain the input voice signal transferred from the user.

The processor 620 applies pre-stored training data to the input voice signal. For example, the training data indicates an intent classifier generated through machine learning-based deep learning based on a relationship between a voice signal and an intent of the user making an utterance, or a relationship between the voice signal and a domain. The processor 620 calculates a probability distribution corresponding to at least one intent associated with the utterance using the training data. In addition, the processor 620 selects a target feature extractor based on the calculated probability distribution. The target feature extractor includes either one or both of a training-based feature extractor and a rule-based feature extractor. The processor 620 extracts a feature associated with the utterance using the selected target feature extractor.

The display 630 outputs, to the user, a result of performing a task corresponding to the extracted feature. For example, in a case that the utterance is associated with "how is the weather tomorrow?," the processor 620 calculates a probability of an intent associated with "the weather" from the utterance of the user, and extracts a feature associated with "tomorrow" using the target feature extractor, which corresponds to an intent having a probability value greater than or equal to a preset probability value. The display 630 outputs information on the weather of tomorrow as a task associated with "the weather" of "tomorrow." The example illustrated in FIG. 6A is not construed as limiting a scope of other examples and, thus, a result of performing various types of tasks may be output through the display 630. For example, a video stored in the electronic device 600 is played through the display 630, or a schedule related to the user is output through the display 630.

Figure 6B:
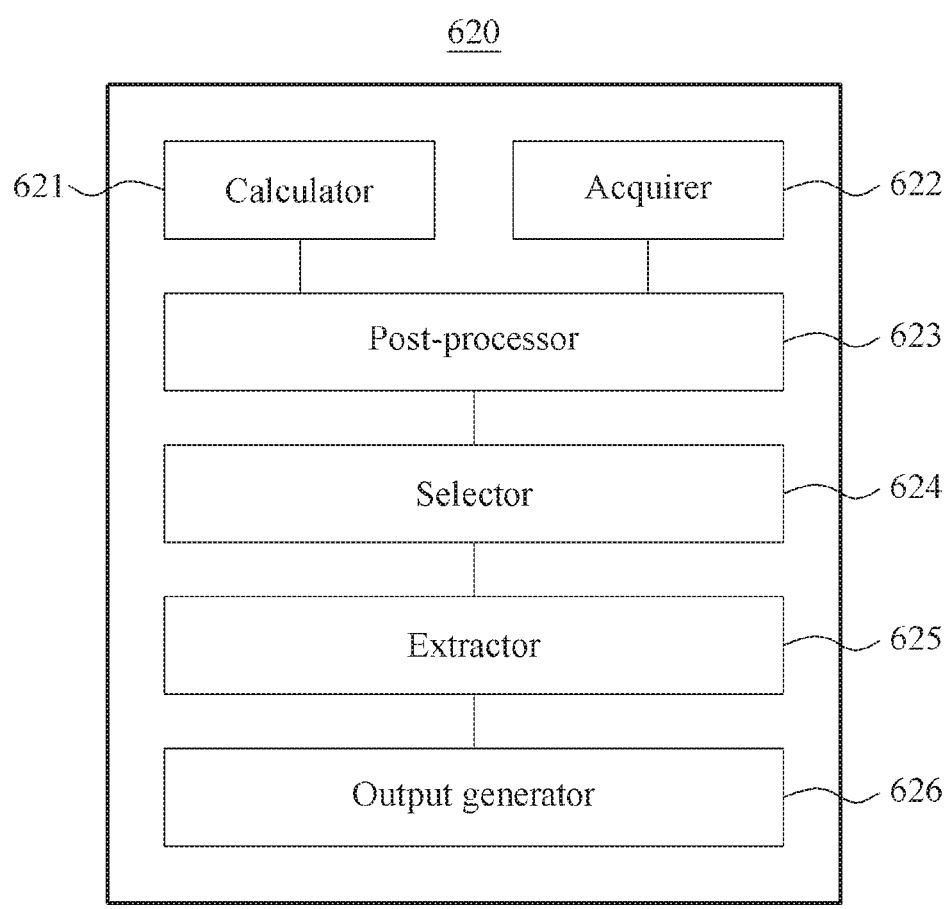
FIG. 6B is a diagram illustrating an example of a processor in an electronic device.

FIG. 6B is a diagram illustrating an example of a processor included in an electronic device.

Referring to 6B, the processor 620 of the electronic device 600 illustrated in FIG. 6A includes a calculator 621, an acquirer 622, a post-processor 623, a selector 624, an extractor 625, and an output generator 626. For detailed descriptions of the selector 624, the extractor 625, and the output generator 626, reference may be made to the descriptions provided with reference to FIGS. 2A and 2B and, thus, a more detailed and repeated description is omitted here for brevity.

The calculator 621 calculates a probability distribution corresponding to at least one intent associated with an utterance of a user by applying training data to an input voice signal of the user obtained from the sensor 610 of the electronic device 600. The acquirer 622 receives user information and device information corresponding to a point in time at which the utterance is input.

The post-processor 623 adjusts a probability value of the intent to be provided to the selector 624 using either one or both of the user information and the device information obtained by the acquirer 622.

As described above, the processor 620 selects either one or both of a training-based feature extractor and a rule-based feature extractor using the probability distribution corresponding to each intent to which the user information or the device information corresponding to the point in time at which the utterance is made. The processor 620 extracts various features of a small scale to a complex scale based on the intent associated with the utterance. The apparatuses, calculator, acquirer, selector, extractor, generator, modules, devices, and other components illustrated in FIGS. 2A and 2B, and 6A and 6B that perform the operations described herein with respect to FIGS. 1, 3, 4, and 5 are implemented by hardware components. Examples of hardware components include controllers, sensors, generators, drivers, and any other electronic components. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that will be apparent after an understanding of the disclosure of this application configured to respond to and executing instructions in a defined manner to achieve a desired result. In other examples, one or more of the hardware components that perform the operations described in this application are implemented by computing hardware, for example, by one or more processors or computers.

A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1, 3, 4, and 5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are executed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A voice recognition apparatus, comprising:
a processor configured to:

calculate a probability distribution corresponding to an intent associated with an utterance from a user by applying stored training data to an input voice signal input based on the utterance;

obtain a device information corresponding to a point in time at which the utterance is input;

adjust a probability value of the intent using the device information;

select a target feature extractor including either one or both of a training-based feature extractor and a rule-based feature extractor using the probability distribution corresponding to each intent to which the device information corresponding to the point in time at which the utterance is made; and extract a feature associated with the utterance based on the selected target feature extractor, wherein the processor selects the training-based feature extractor, in response to a feature determined to be complex being included in the intent, wherein the processor selects the rule-based feature extractor, in response to a feature determined to be simple being included in the intent, and wherein the processor is further configured to adjust a probability value of an intent uncorrelated with a first mode to be less than or equal to a threshold value, in response to obtaining the device information operating in a first mode.

2. The voice recognition apparatus of claim 1, wherein the processor is further configured to verify an intent having a probability value in a range, and select, as the target feature extractor, one of the training-based feature extractor and the rule-based feature extractor based on the verified intent.

3. The voice recognition apparatus of claim 1, wherein the processor is further configured to:

perform a task corresponding to the extracted feature; and verify an intent having a probability value in a range;

select, as the target feature extractor, a number of feature extractors based on the verified intent; and calculate a likelihood value corresponding to the number of feature extractors.

4. The voice recognition apparatus of claim 3, wherein the processor is further configured to select, as the number of feature extractors, either one or both of the training-based feature extractor and the rule-based feature extractor.

5. The voice recognition apparatus of claim 3, wherein the processor is further configured to perform a target task corresponding to a feature outputting a highest likelihood value among likelihood values corresponding, respectively, to the number of feature extractors.

6. The voice recognition apparatus of claim 1, wherein the either one or both of a user information and the device information corresponds to a point in time at which the utterance is input, and the processor is further configured to repeat the obtaining of the either one or both of the user information and the device information based on a number of times utterances are input.

7. The voice recognition apparatus of claim 1, wherein the processor is further configured to:

obtain user information; and adjust the probability distribution using a statistical intent distribution, in response to an acquirer obtaining, as the user information, the statistical intent distribution of the user corresponding to a point in time at which the utterance is input.

8. The voice recognition apparatus of claim 1, wherein the processor is configured to adjust a probability value of an intent uncorrelated with the device information to be less than or equal to a threshold value, in response to obtaining the device information based on a device characteristic.

9. A voice recognition method, comprising:

calculating a probability distribution corresponding to an intent associated with an utterance of a user by applying stored training data to an input voice signal input based on the utterance;

obtaining a device information corresponding to a point in time at which the utterance is input;

adjusting a probability value of the intent using the device information;

selecting a target feature extractor including either one or both of a training-based feature extractor and a rule-based feature extractor using the probability distribution corresponding to each intent to which the device information corresponding to the point in time at which the utterance is made; and extracting a feature associated with the utterance based on the selected target feature extractor, wherein the selecting of the target feature extractor comprises selecting the training-based feature extractor, in response to a feature determined to be complex being included in the intent, and selecting the rule-based feature extractor, in response to a feature determined to be simple being included in the intent, wherein, in response to an acquirer obtaining the device information operating in a first mode, adjusting a probability value of an intent uncorrelated with the first mode to be less than or equal to a threshold value.

10. The voice recognition method of claim 9, wherein the selecting of the target feature extractor comprises verifying an intent having a probability value in a range.

11. The voice recognition method of claim 10, further comprising:

selecting, as the target feature extractor, a number of feature extractors based on the verified intent; and calculating a likelihood value corresponding to each of the number of feature extractors.

12. The voice recognition method of claim 11, further comprising:

performing a task corresponding to a feature outputting a highest likelihood value among likelihood values corresponding, respectively, to the number of feature extractors.

13. A non-transitory computer-readable storage medium storing instructions that, when executed by a processor, cause the processor to perform the method of claim 11.

14. The voice recognition method of claim 9, wherein the selecting of the target feature extractor comprises selecting one of the training-based feature extractor and the rule-based feature extractor using the calculated probability distribution based on a probability value in a range.

15. An electronic device configured to provide a conversation agent to converse with a user, the electronic device comprising:

a sensor configured to obtain an input voice signal input based on an utterance of the user;

a processor configured to calculate a probability distribution corresponding to an intent associated with the utterance by applying training data to the input voice signal, obtain a device information corresponding to a point in time at which the utterance is input, adjust a probability value of the intent using the device information, select a target feature extractor based on the probability distribution corresponding to each intent to which the device information corresponding to the point in time at which the utterance is made, extract a feature associated with the utterance based on the selected target feature extractor, and output a result indicative of the extracted feature; and a display configured to output the result, wherein the target feature extractor includes either one or both of a training-based feature extractor and a rule-based feature extractor, wherein the processor selects the training-based feature extractor, in response to a feature determined to be complex being included in the intent, wherein the processor selects the rule-based feature extractor, in response to a feature determined to be simple being included in the intent, and wherein, in response to an acquirer obtaining the device information operating in a first mode, the processor is configured to adjust a probability value of an intent uncorrelated with the first mode to be less than or equal to a threshold value.

16. The electronic device of claim 15, wherein the processor is further configured to verify an intent having a probability value in a preset range and select, as the target feature extractor, one of the training-based feature extractor and the rule-based feature extractor based on the verified intent.

17. The electronic device of claim 15, wherein the processor is further configured to select, as the target feature extractor, a number of feature extractors based on a probability value in a preset range, and perform a task corresponding to a feature outputting a highest likelihood value among likelihood values corresponding, respectively, to a preset number of feature extractors.

* * * * *